(12) United States Patent
Suda et al.

(10) Patent No.: US 7,537,097 B2
(45) Date of Patent: May 26, 2009

(54) ELECTROMAGNETIC DAMPER CONTROL DEVICE

(75) Inventors: Yoshihiro Suda, Tokyo (JP); Kouji Hio, Tokyo (JP); Takuhiro Kondo, Tokyo (JP); Hideki Yamagata, Tokyo (JP)

(73) Assignees: The Foundation for the Promotion of Industrial Science, Tokyo (JP); Kayaba Industry Co., Ltd., Tokyo (JP)

( * ) Notice: Subject to any disclaimer, the term of this patent is extended or adjusted under 35 U.S.C. 154(b) by 297 days.

(21) Appl. No.: 10/566,095

(22) PCT Filed: Jul. 31, 2003

(86) PCT No.: PCT/JP03/09736

§ 371 (c)(1),
(2), (4) Date: Sep. 19, 2006

(87) PCT Pub. No.: WO2005/012758

PCT Pub. Date: Feb. 10, 2005

(65) Prior Publication Data

US 2007/0170024 A1 Jul. 26, 2007

(51) Int. Cl.
F16F 15/03 (2006.01)
(52) U.S. Cl. .................. 188/267; 188/156; 188/164
(58) Field of Classification Search ............... 188/267, 188/156–164
See application file for complete search history.

(56) References Cited

U.S. PATENT DOCUMENTS 4,168,840 A * 9/1979 Graham .............. 267/64.16
4,526,401 A 7/1985 Kakizaki et al.
4,815,575 A 3/1989 Murty
5,091,679 A 2/1992 Murty et al.
5,136,451 A * 8/1992 Valdemarsson et al. ........ 361/2
2001/0043450 A1 11/2001 Seale et al.
2002/0166741 A1 11/2002 Kock et al.

FOREIGN PATENT DOCUMENTS

| JP | 07-167207 | 7/1995 |
|---|---|---|
| JP | 08-213853 | 8/1996 |
| JP | 10-066258 | 3/1998 |
| JP | 2001-311452 | 11/2001 |
| KR | 20020044446 | 6/2002 |
| KR | 20020086933 | 11/2002 |
| WO | WO-0287909 | 11/2002 |

* cited by examiner

Primary Examiner—Melanie Torres
(74) Attorney, Agent, or Firm—Rabin & Berdo, PC (57) ABSTRACT

An electromagnetic damper control device including a first member containing a magnet, and a second member containing a solenoid combined to permit relative rotation. The relative rotation of the first and second members induces an electromagnetic force in a solenoid that serves as a damping force to a motion. The device further comprises a current limiter device operated by a voltage generated in the solenoid due to the relative rotation of the first member and second member. The current limiter devices regulates the electrical current flowing in the solenoid to a specific value based on the voltage generated in the solenoid so that by regulating the damping force of the electromagnetic damper a desired damping force can be applied to the electromagnetic damper without requiring external electrical power.

8 Claims, 11 Drawing Sheets

ELECTROMAGNETIC DAMPER CONTROL DEVICE

TECHNICAL FIELD

This invention relates to an electromagnetic damper control device utilized in vehicles and buildings and relates in particular to an electromagnetic damper control device for regulating the damping force of electromagnetic dampers without applying external electrical power.

BACKGROUND ART

A conventional electromagnetic damper includes a cylinder and an outer body constructed to extend and contract relative to each other. The movement of the cylinder makes a nut fixed to the cylinder rotate a ball shaft formed with screw threads, so that rotation of a motor connected to the ball shaft generates an induced electromotive force. By regulating an electrical current flowing in the motor, a desirable damping force is obtained.

An electromagnetic damper control device for regulating this electrical current as proposed in JP 2001-311452 A, raises the induction voltage in the electromagnetic damper by changing the duty rate for switching a transistor that switches the electrical current output from the motor, so that the desired damping force can be obtained in the electromagnetic damper.

However, in order to operate a regulating circuit for this type of control, a supply of external electrical power to the regulating circuit is required in the above described conventional electromagnetic damper control device. In other words, the conventional electromagnetic damper has a problem that damping effect could not be obtained in a state where the power supply is off. Moreover, since the duty rate of the switching transistor is set by a control program based on the voltage generated in the motor, it is not easy to change the damping force characteristics of the electromagnetic damper.

It is therefore an object of this invention to provide an electromagnetic damper control device capable of arbitrarily changing the damping force characteristics of the electromagnetic damper without requiring a supply of external electrical power.

DISCLOSURE OF THE INVENTION

In order to achieve the above object, this invention provides an electromagnetic damper control device for such an electromagnetic damper comprising a first member containing a magnet, and a second member containing a solenoid, wherein a relative rotation of the first member and the second member generates an electromagnetic force in the solenoid which acts as a damping force to the relative rotation. The device comprises a current limiter element which operates based on the electrical voltage generated in the solenoid due to the relative rotation of the first member and the second member. The current limiter element limits a current flowing through the solenoid to a predetermined current determined depending on a voltage generated in the solenoid.

Further, the electromagnetic damper control device comprises a plurality of current limiter circuits each of which comprises the current limiter element, and the limiter circuits are connected in parallel and configured to operate at different voltages to limit the current flowing through the solenoid to the predetermined current.

Still further, the electromagnetic damper control device further comprises a current limiter circuit comprising a fixed voltage element generating a fixed voltage and the current limiter element which limits the electrical current flowing through the solenoid to the predetermined current, wherein the fixed voltage generated by the fixed voltage element is applied to the current limiter element so as to limit the current flowing through the solenoid to the predetermined current, when the electrical voltage generated in the solenoid has reached a predetermined voltage.

Still further, the fixed voltage element comprises a shunt regulator and the current limiter element comprises a field effect transistor, wherein the shunt regulator is configured to generate the fixed voltage when the electrical voltage generated in the solenoid has reached the predetermined voltage, and the field effect transistor is configured to control electrical current flowing between a source and a drain at a fixed current when the fixed voltage is applied to a gate of the field effect transistor.

Still further, the current limiter circuit further comprises a setting circuit which sets the fixed voltage generated by the fixed voltage element.

Still further, the shunt regulator comprises at least a first terminal connected to a high potential side and a second terminal connected to a low potential side and a reference voltage terminal to which a reference voltage for the operation of the shunt regulator, and the current limiter circuit further comprises a variable resister element which is interposed between the reference voltage terminal and the first terminal or between the reference voltage terminal and the second terminal and a setting circuit which sets the fixed voltage generated by the fixed voltage element.

Still further, the electromagnetic damper comprises a motor comprising a stator as the first member and a rotor as the second member, a cylinder performing a linear movement, and a motion converting member comprising a rotating member screwed on the cylinder to convert the linear movement into a rotational movement. The rotating member is fixed to any one of the rotor and the stator, and configured to generate a damping force using an electromagnetic force that acts between the rotor and the stator. According to the eighth invention, the electromagnetic damper comprises a stator as the first member and a rotor as the second member, an arm member connected to one of the rotor and the stator, a fixed member connected to the other one of the rotor and the stator, and an auxiliary damper interposed between the arm member and the fixed member, and the electromagnetic damper is configured to cause any one of the rotor and the stator to rotate according to a swing motion of the arm member and generate a damping force using an electromagnetic force that acts on the motor.

This invention is therefore capable of regulating the damping force of the electromagnetic damper by means of a simple circuit without supplying external electrical power to the electromagnetic damper control device.

Moreover, the damping force of the electromagnetic damper can be regulated in multiple stages by a simple circuit.

Also, the swing movement of the arm member rotates either the rotor or the stator and a damping force is generated by utilizing the electromagnetic force acting on the motor so that a suitable damping force can be applied to the electromagnetic damper regardless of the structure of the electromagnetic damper.

BEST MODE FOR CARRYING OUT THE INVENTION

Referring to the drawings, preferable embodiments of this invention will now be described.

Figure 1:
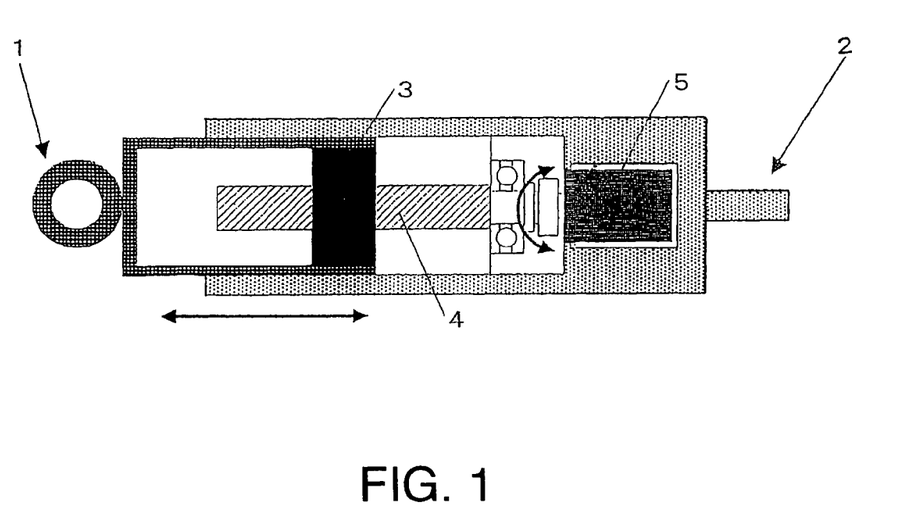
FIG. 1 is a cross-sectional view of an electromagnetic damper for which an electromagnetic damper control device according to this invention is provided.

FIG. 1 is a cross-sectional view showing the structure of an electromagnetic damper to which an electromagnetic damper control device according to this invention is applied.

The damper comprises a cylinder 1 and a cylindrical outer tube 2 that accommodates the cylinder 1 so as to be free to slide axially. a long the inner circumference of the outer tube 2. A nut 3 having screw threads (grooves) on the inner circumference thereof is fixed in the cylinder 1 so as not to rotate with respect to the cylinder 1.

Figure 11:
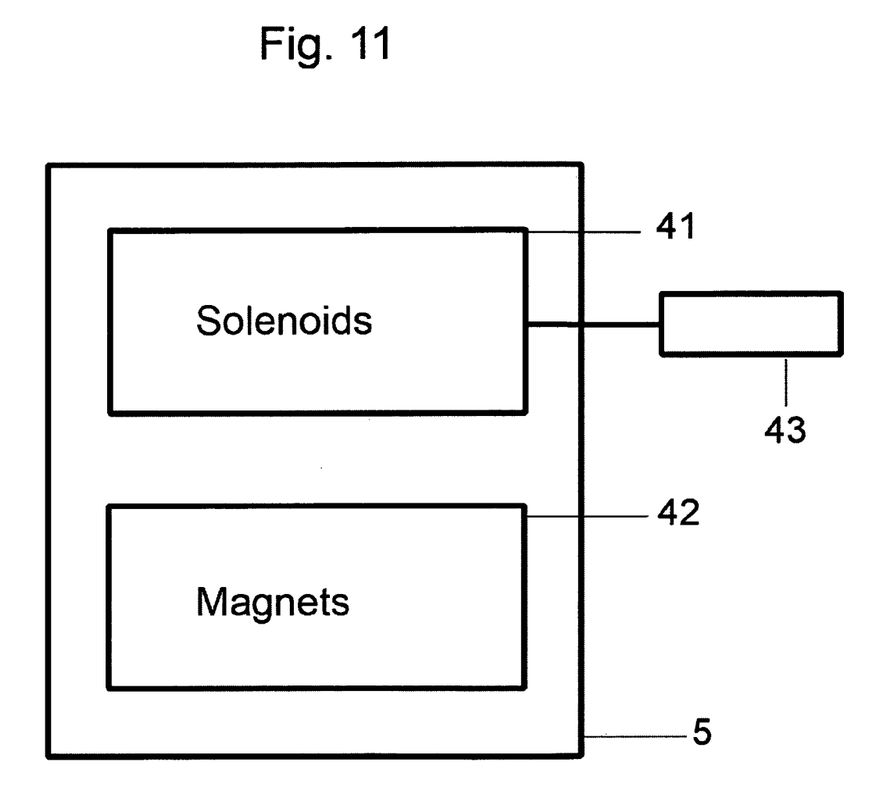
FIG. 11 is a schematic diagram of an exemplary motor comprising an electromagnetic damper control device according to this invention.

With reference to FIGS. 1 and 11, a shaft (ball screw) 4 having screw threads (ridges) on the outer circumference thereof is fitted within the outer tube 2 so as to be free to rotate. The screw threads (grooves and ridges) of this nut 3 and ball screw 4 mutually engage with each other, and when the cylinder 1 slides within the cylindrical outer tube 2, the nut 3 is rotates the ball screw 4. The ball screw 4 is lined to the rotating shaft of a direct current motor 5. The motor 5 contains solenoids 41 and magnets 42. The solenoids are attached to the rotating shaft 43 and by moving in the vicinity of the magnets, generate an induced electromotive force according to the number of rotations of the motor.

In the electromagnetic damper thus constructed, the cylinder 1 is capable of sliding axially inside the outer tube 2. When the cylinder 1 displaces in the outer tube 2, the nut 3 engaged with the ball screw 4 causes the ball screw 4 to rotate.

The motor 5 then rotates due to the rotation of the ball screw 4 and an induced electromotive force is generated in the motor 5.

Next, the application of this electromagnetic damper to a vehicle will be described.

The electromagnetic damper is installed in a vehicle in such a way that the outer tube 2 is attached to a chassis of the vehicle, while the cylinder 1 is attached to the suspension side. The up and down movement of the chassis is converted into an elongating/contracting movement of the cylinder 1 and the outer tube 2, and formally, it is converted into rotations of the ball screw 4. The rotating shaft of the motor 5 therefore rotates according to the up and down movement of the chassis, and an induced electromotive force is generated in the motor 5 that corresponds to the number of rotations of the rotating shaft (ball screw 4) of the motor 5. As a result, an electrical current therefore flows in the motor 5.

By applying a limitation to the electrical current flowing in the motor 5 that is generated by the induced electromotive force, it is possible to generate a rotational torque in a direction opposite to that of the rotating shaft (ball screw 4) of the motor 5.

This torque in the opposite direction corresponds to a damping force (load) that the electromagnetic damper generates, and the damping force of the electromagnetic damper can be regulated by varying the amount of current flowing in the motor 5.

Specifically, if a large current is allowed to flow in the motor 5, then the torque generated in the motor 5 in the direction opposite to that of the rotating shaft is large.

If only a small current is allowed to flow in the motor 5, then the torque generated in the motor 5 in the direction opposite to that of the rotating shaft is small.

The electromagnetic damper thus exerts a force on the cylinder 1 in the opposite way with respect to the force exerted on the cylinder 1 when the motor 5 acts as an actuator.

Compared to oil dampers, this type of electromagnetic damper renders the advantage that energy can be recovered through the movement of the cylinder. Further, the displacement of the cylinder 1 can be directly detected without installing a special sensor in the damper. Specifically, the elongation/contraction direction and amount can be detected from the number of rotations and rotation direction of the motor 5.

Still further, an oil-free damper can be obtained since there are no oil leaks because the damper does not use oil. Also compared to conventional oil dampers, this electromagnetic damper possesses good control characteristics and can easily be applied to semi-active suspensions, etc. The damping force of the damper can be easily changed leading to the possible applications as damper tuning tool.

Figure 2:
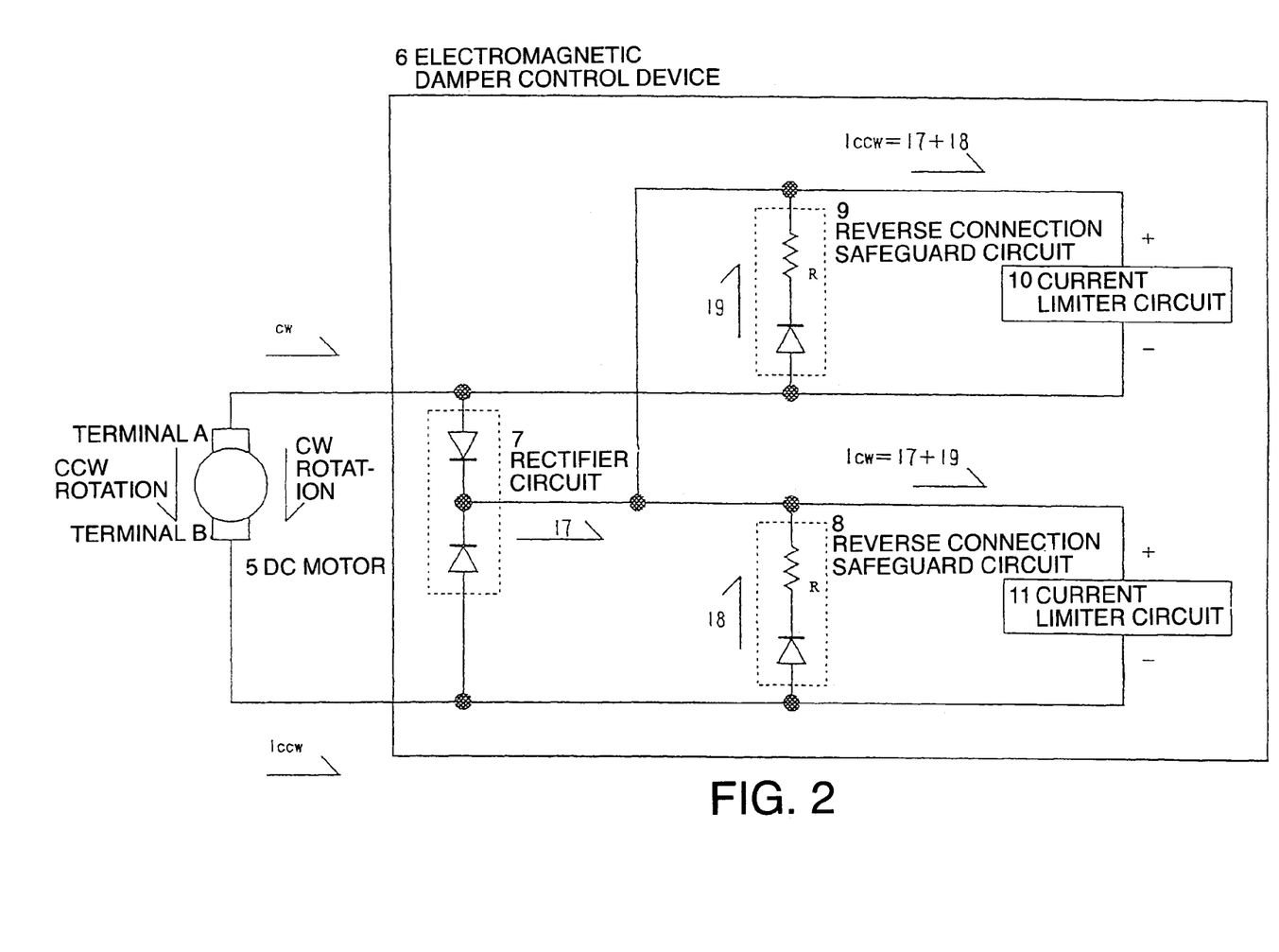
FIG. 2 is a circuit diagram of the electromagnetic damper control device according to a first embodiment of this invention.

FIG. 2 is a circuit diagram of the electromagnetic damper control device according to a first embodiment of this invention.

The voltage output from the motor 5 is input to the electromagnetic damper control device 6. The electromagnetic damper control device 6 then controls the current flow in the motor 5 to regulate the damping force of the electromagnetic damper.

The electromagnetic damper control circuit 6 comprises a half-wave rectifier circuit 7 to rectify the direction of the electrical current output from the motor 5, reverse connection safeguard circuits 8, 9 to protect the current limiter circuits 10, 11 from reverse voltage, and current limiter circuits 10, 11 to control the size of the current output from the motor 5.

When the motor 5 rotates clockwise (CW), an induced electromotive force is generated. in the motor 5 with the terminal A as positive and the terminal B as negative, and the electrical current ICW output from the motor 5 flows in the direction indicated by the arrow in the figure. This electrical current ICW flows via the rectifier circuit 7, to a CW side current limiter circuit 10 (17).

A portion of the electrical current ICW output from the motor 5 flows through the reverse connection safeguard circuit 9 to the CW side current limiter circuit 10 (I9) without transiting through the rectifier circuit 7. The electrical current output from the motor 5 during rotation in the clockwise (CW) direction or in other words, the electrical current ICW flowing in the CW side of the current limiter circuit 10 therefore becomes;

$$ICW = I7 + I9$$

The amount of the electrical current ICW is regulated by the CW side current limiter circuit 10. A reverse connection safeguard circuit 9 at this time prevents current from flowing to a counterclockwise (CCW) side current limiter circuit 11 so that the CCW side current limiter circuit 11 does not operate.

In contrast, when the motor 5 is rotating counterclockwise (CCW), an induced electromotive force is generated in the motor 5 with the terminal B as positive and the terminal A as negative, and the electrical current output from the motor 5 flows in the direction indicated by the arrow in the figure. This electrical current Iccw flows via the rectifier circuit 7 to the CCW side current limiter circuit 11 (17). A portion of the electrical current Iccw output from the motor 5 flows through the reverse connection safeguard circuit 8 to the CCW side current limiter circuit 11 (I8) without passing through the rectifier circuit 7. Therefore, the electrical current output from the motor 5 during forward (CCW) rotation or in other words, the electrical current Iccw flowing to the CCW side current limiter circuit 11 becomes;

$$ICW = I7 + I8$$

The amount of the electrical current Iccw is regulated by the CCW current limiter circuit 11. The reverse connection safeguard circuit 8 at this time prevents electrical current from flowing to the CW side current limiter circuit 10 so that the CW side current limiter circuit 10 does not operate.

Figure 3:
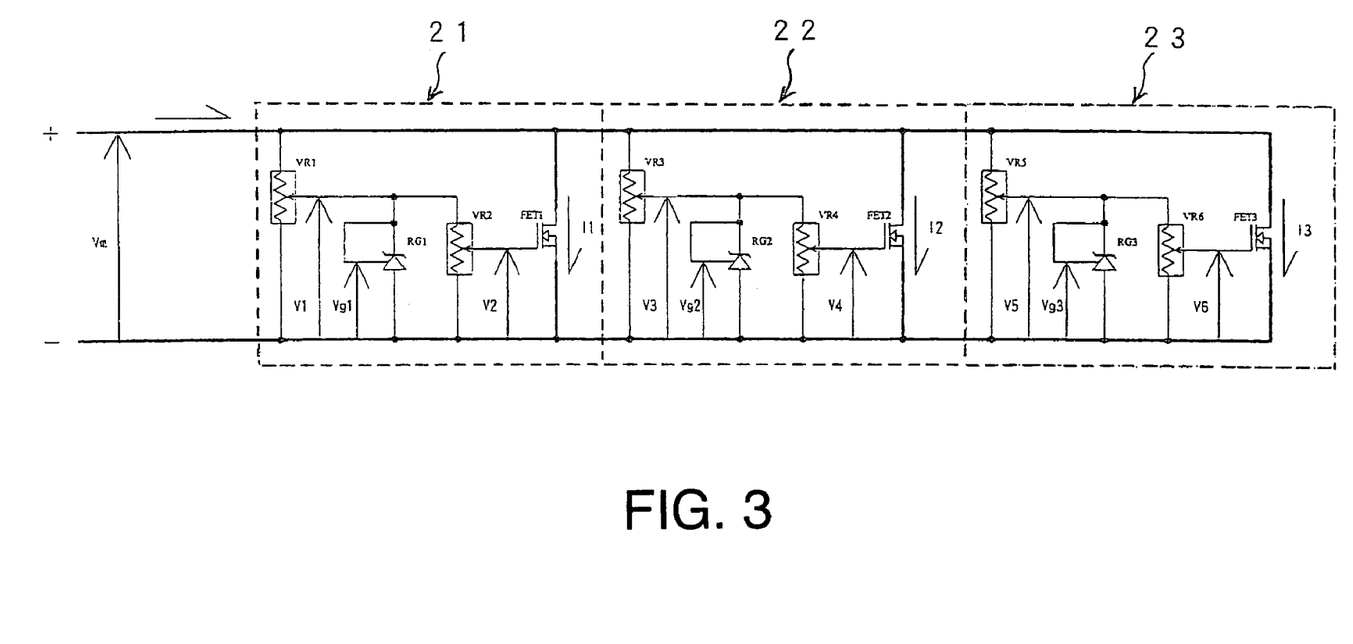
FIG. 3 is a circuit diagram of a current limiter circuit according to the first embodiment of this invention.

FIG. 3 is a circuit diagram of the current limiter circuits 10, 11 according to the first embodiment of this invention.

The current limiter circuits 10, 11 are each comprised of three current limiter circuit modules 21, 22, 23 (enclosed by dashed line in the figure) connected in parallel. The operation of each of these current limiter circuit modules is the same, and hence, the operation of the first current limiter circuit module 21 is described and the description of the operation of the other current limiter circuit modules 22 and 23 is omitted.

The electromotive force induced by rotation of the motor 5 in the clockwise (CW) or counterclockwise (CCW) direction is applied as a voltage Vm to the current limiter circuits 10 and 11. A resistor VR1 is connected across the positive and negative terminals of the current limiter circuit module 21 to divide the voltage Vm.

According to the first embodiment of this invention, the resistor VR1 is a variable resistor, and the resistor VR1 can change the voltage division ratio so as to make a divided voltage V1 variable. A shunt regulator RG1 is connected across the variable contact point of the resistor VR1 and the negative side terminal. The voltage across the anode and cathode of the shunt regulator is regulated so as not to rise above a specified reference voltage (regulator voltage) Vg1. A TL431 by Texas Instruments Incorporated may preferably be used as the shunt regulator.

A resistor VR2 is connected in parallel with this shunt regulator RG1. This resistor VR2 divides the voltage across the cathode and anode of the shunt regulator and generates a gate voltage V2 for a field effect transistor FET1. The field effect transistor FET1 is connected across the positive and negative terminals of the current limiter circuit module 21. The gate voltage V2 regulates the current flowing across the source and drain of the FET1, to regulate the current flowing through the current limiter circuit module 21. A power MOSFET is preferably used as the FET1 since this field effect transistor possesses a fast response speed and a low on-resistance.

A Zener diode may be used instead of the shunt regulator RG1. However, caution is needed since it has large fluctuations in the regulator voltage (Zener voltage) and the Zener voltage is susceptible to changes in temperature.

Figure 4:
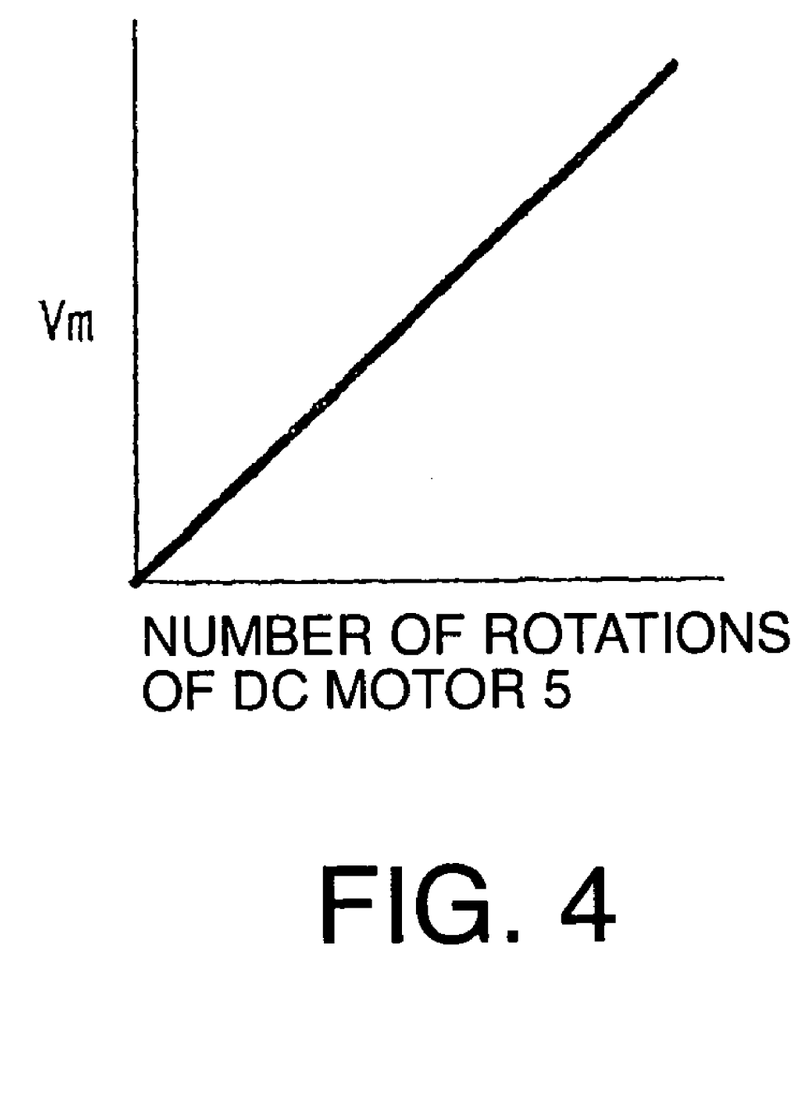
FIG. 4 is a diagram showing the relation between an output voltage Vm and the number of rotations of a motor according to the first embodiment of this invention.

FIG. 4 is a diagram showing the relation of the output voltage Vm to the number of motor rotations according to the first embodiment of this invention. In the diagram, the abscissa represents the number of rotations of the motor 5, and the ordinate represents the output voltage Vm generated by the motor 5. As can be understood from the figure, when the motor 5 rotates, an output voltage Vm is generated due to an induced electromotive force proportional to the number of rotations of the motor 5. This is the electrical power generation effect of the motor 5.

Figure 5:
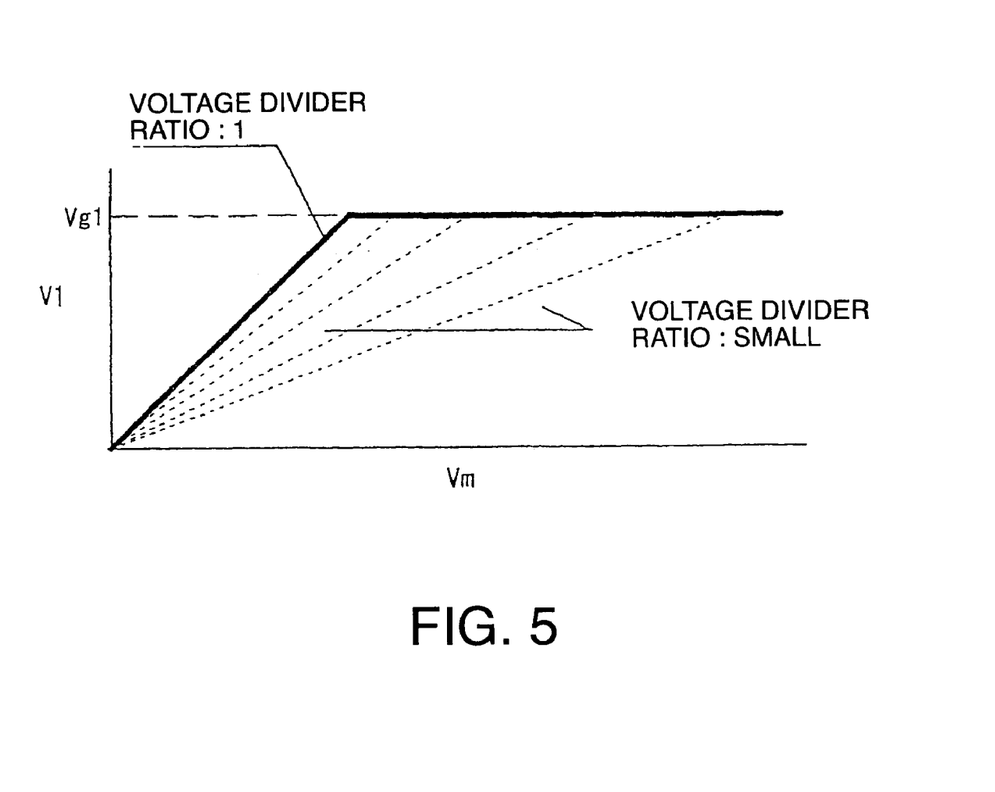
FIG. 5 is a diagram showing the relation between a divided voltage V1 and an output voltage Vm of the motor according to the first embodiment of this invention.

FIG. 5 is a diagram showing the relation of the voltage divided voltage V1 to the motor output voltage Vm according to the first embodiment of this invention. In the diagram, the abscissa represents the output voltage Vm generated by the motor 5, and the ordinate represents the divided voltage V1 divided by the VR1. In this diagram, when the output voltage Vm of the motor 5 gradually rises due to rotation of the motor 5, V1 rises according to a voltage divider ratio set by the VR1. When the output voltage Vm of the motor 5 further increases, as can be understood from the diagram, V1 reaches the regulator voltage Vg1 of the shunt regulator RG1. Thereafter, V1 is maintained at a fixed voltage (regulator voltage) Vg1 due to the effect of the shunt regulator RG1.

The multiple lines in the diagram indicate changes in the V1-Vm characteristics due to changes in the voltage divider ratio set by VR1. The more to the lower right the lines are in the diagram, the smaller the voltage divider ratio (V1/Vm) set by the VR1. In other words, the smaller the voltage divider ratio, the lower the divided voltage V1 generated by the VR1, even if the motor 5 output voltage Vm is the same.

Figure 6:
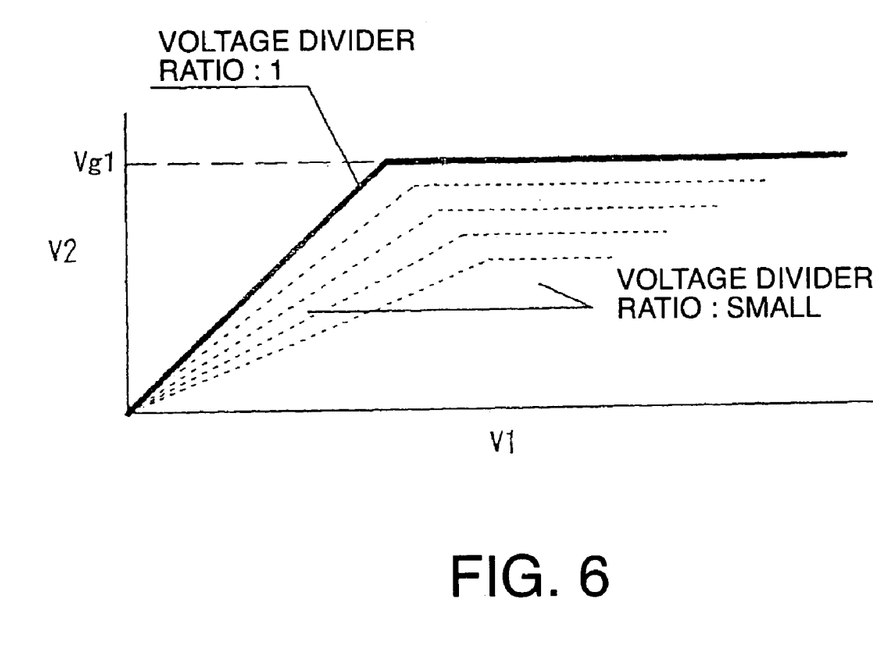
FIG. 6 is a diagram showing the relation between a gate voltage V2 and the voltage-divided voltage V1 according to the first embodiment of this invention.

FIG. 6 is a diagram showing the relation of the gate voltage V2 to the divided voltage V1 according to the first embodiment of this invention.

In this diagram, the abscissa represents the divided voltage V1 by the VR1, and the ordinate represents the gate voltage V2 that is obtained by voltage division by the VR2. In this diagram, when the output voltage Vm of the motor 5 rises due to the rotation of the motor 5 and, accordingly, V1 gradually becomes high, V2 also becomes high according to the voltage divider ratio set by the VR2. It can also be seen that, when the output voltage Vm of motor 5 further rises, and the V1 is limited to the regulator voltage Vg1 by the effect of the shunt regulator RG1, V2 is also limited to the voltage established by the voltage divider ratio set by the VR2.

The multiple lines in the diagram indicate changes in V2-V1 characteristics due to changes in the voltage divider ratio set by the VR2. The more to the lower right the lines are in the diagram, the smaller the voltage divider ratio V2/V1 set by the VR2. In other words, the smaller the voltage divider ratio, the lower the divided voltage V2 generated by the VR2, providing that the divided voltage V1 is constant. Also, when the voltage divider ratio V2/V1 becomes small, the voltage V2 becomes low when the divided voltage V1 is saturated (when V1=Vg1).

Figure 7:
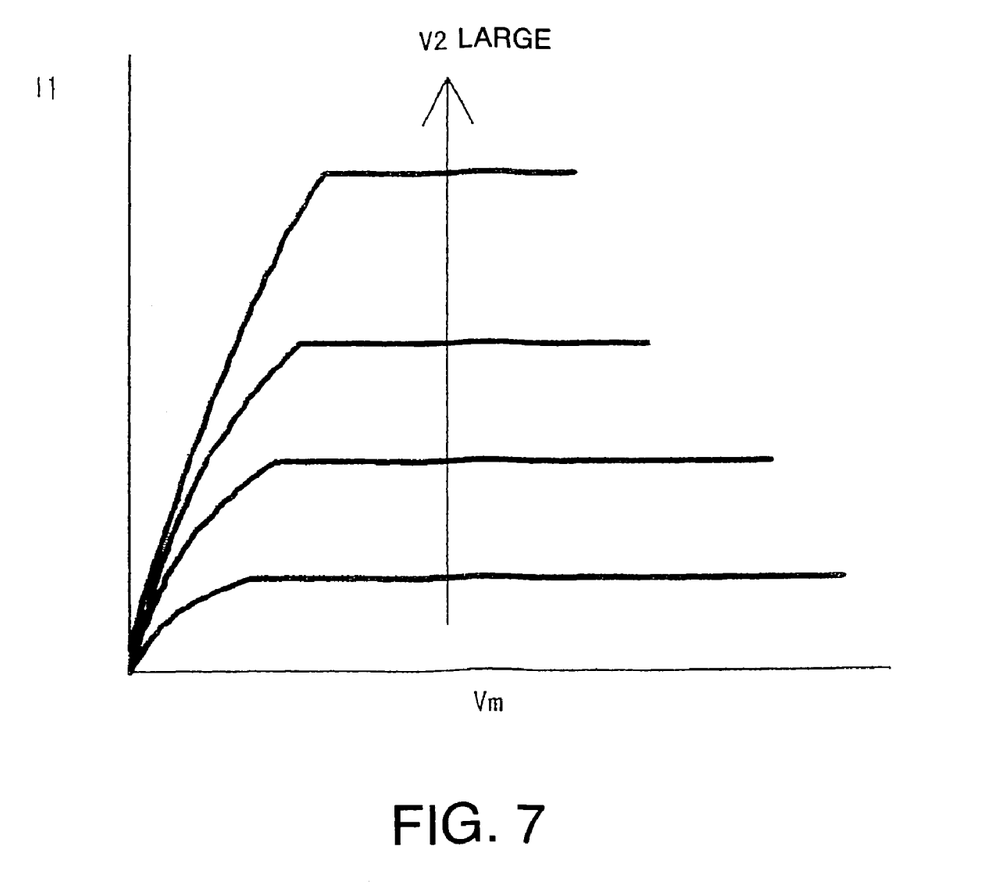
FIG. 7 is a diagram showing the characteristics of an FET according to the first embodiment of this invention.

FIG. 7 is a diagram showing the characteristics of the FET according to the first embodiment of this invention. In this diagram, the abscissa represents the voltage across the drain—source of the FET (output voltage Vm of motor), and the ordinate represents a drain current I1. The multiple lines in the diagram show the changes in the drain current I1 due to the gate voltage V2. Herein, the higher the drawn line, the larger the size of the gate voltage V2.

As shown in this diagram, in the FET according to this embodiment, the drain current I1 in the saturation region increases, as the gate voltage V2 becomes higher, and it can be seen that the drain current I1 is fixed in the saturation region regardless of the drain-source voltage Vm. In other words, the drain current I1 is regulated only by the gate voltage V2 regardless of the drain-source voltage Vm.

The operation of the above described current limiter module 21 will now be described.

When the motor 5 rotates, that power generating effect creates an electromotive force, and the output voltage Vm is applied to the current limiter circuits 10, 11 (current limiter circuit module 21). The voltage Vm applied to these current limiter circuits 10, 11 is proportional to the number of rotations of the motor 5 (FIG. 4). When the cylinder 1 moves at a gradually increasing speed within the outer tube 2, the number of rotations of the motor 5 also increases, and when the Vm rises, the divided voltage V1 by the resistor VR1 rises in proportion to the voltage Vm, according to the voltage divider ratio set on the resistor VR1 (FIG. 5). Accordingly, the gate voltage V2 of FET1 also rises in proportion to the divided voltage V1 by the resistor VR1 according to the voltage divider ratio set on the resistor VR2 (FIG. 6).

Also, even if the number of rotations of motor 5 increases, and the output voltage Vm applied to the current limiter circuits 10, 11 increases even further, after the divided voltage V1 by the resistor VR1 reaches the regulator voltage Vg1, the shunt regulator RG1 limits the divided voltage V1 by the resistor VR1 to the regulator voltage VGg1 and a saturated state is reached. The divided voltage V2 by the resistor VR2 is limited to upper threshold determined by the regulator voltage Vg1 and the voltage divider ratio set by VR2 and reaches a saturated state in the same way.

The divided voltage V2 is the gate voltage of FET1 so that a drain current I1 flows according to the gate voltage V2 in a state where the gate voltage V2 is not saturated (FIG. 7). In other words, the FET1 drain current I1 increases when the gate voltage V2 increases, and the electrical current Icw flowing in the motor 5 increases. The FET1 does not operate in a state where the gate voltage V2 is extremely low, and the drain current I1 does not flow until the gate voltage exceeds the operating point of FET1. In a. saturated state, the gate voltage V2 is a fixed voltage, and the drain current I1 is a fixed current.

In other words, the drain current I1 does not flow when the motor 5 output voltage Vm applied to the current limiter circuits 10, 11 is low (when the gate voltage V2 generated by voltage-dividing of the Vm is extremely low). However, when the output voltage Vm (gate voltage V2) of the motor rises, the drain current I1 of the FET 1 increases and the current Icw flowing in the motor 5 increases. When the output voltage Vm of the motor 5 rises further, the gate voltage V2 saturates at a fixed voltage, and the drain current I1 of FET1 becomes a fixed current.

Figure 8:
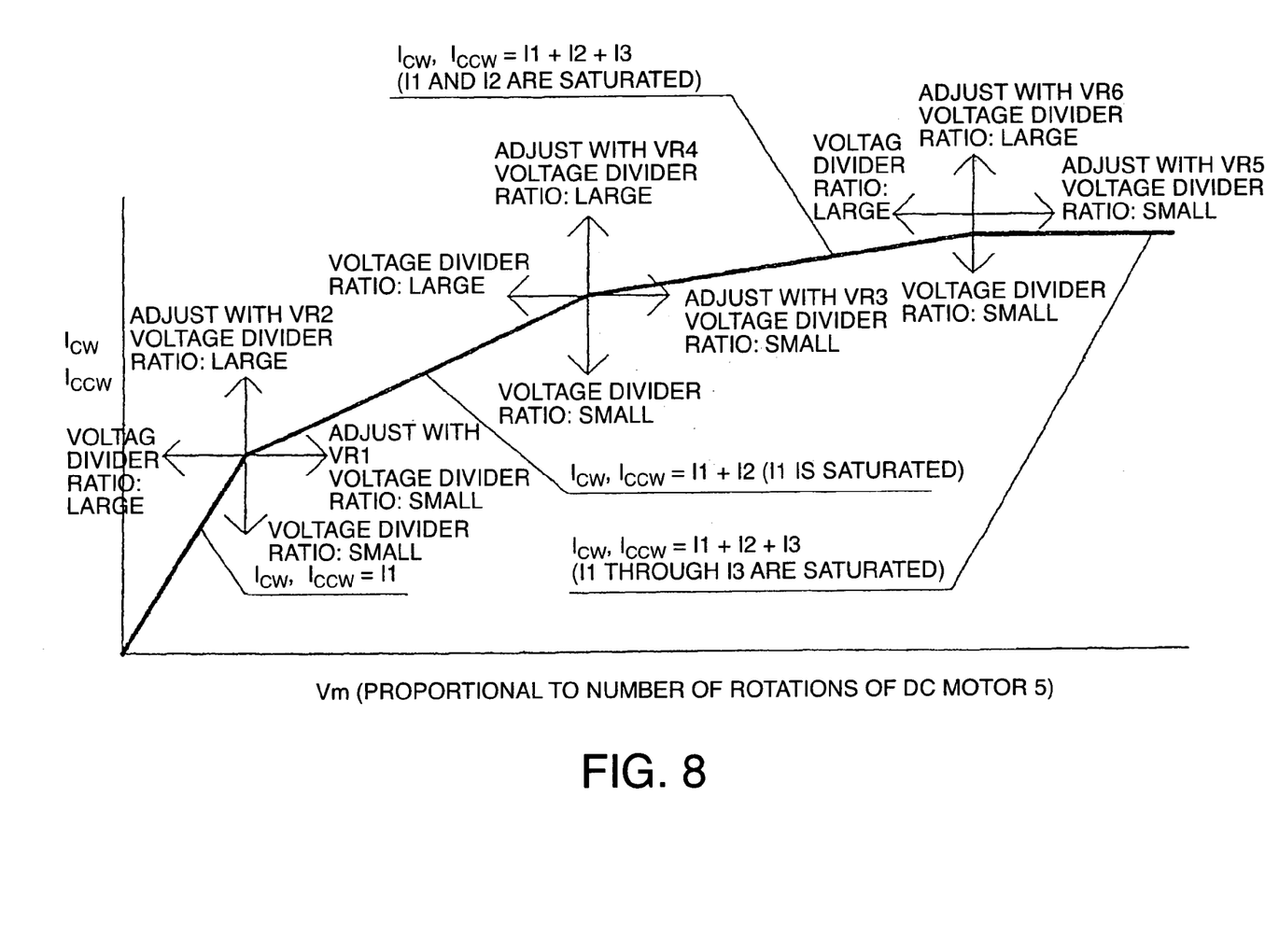
FIG. 8 is a diagram showing the characteristics of the electromagnetic damper control device according to the first embodiment of this invention.

FIG. 8 is a diagram showing the characteristics of the current limiter circuits 10, 11. In this diagram, the abscissa represents the voltage (output voltage Vm of the motor 5) applied to the current limiter circuit, and the ordinate represents the current Iccw that flows into the current limiter circuit 10.

Points where any of the drain currents I1, I2, I3 saturates correspond to inflection points of the current Icw. The position of each inflection point can be changed upward, downward, or left, right in the diagram by the resistors VR1 through VR6. The number of inflection points can be changed by the number of current limiter circuit modules connected in parallel within the current limiter circuit.

In other words, the number of inflection points can be changed as desired by adjusting the number of current limiter circuit modules as needed. The inflection point can be changed to a desired position by adjusting the resistance values of the VR1 through the VR6 within the current limiter circuit module as needed. The torque generated in the direction opposite to the rotation direction of the motor 5 can therefore be regulated arbitrarily by controlling the current Icw flowing in the motor 5.

When the number of rotations of the motor 5 increases, the gate voltage V2 of the FET1 also increases, and the drain current I1 increases. When the number of motor 5 rotations increases even further, the gate voltage V2 of the FET1 is limited to the regulator voltage Vg1, and the drain current I1 saturates at a fixed current. When the output voltage Vm of the motor 5 has reached the saturation voltage (first inflection point) determined by the saturation value of drain current I1, the variable resistor VR3 is then adjusted so as to exceed the gate voltage operating point of the FET 2.

To summarize the above, after the current (drain current I1) flowing in the current limiter circuit module 21 has saturated, the current limiter circuit module 22 is adjusted to start a flow of current (drain current I2) in the current limiter circuit module 22.

Therefore, only the first current limiter circuit module operates in the period up to the first inflection point, and the drain current I1 of the FET1 flows in the motor 5 so that the motor current Icw becomes;

$$Icw=I1$$

The current flow in the first current limiter circuit module is saturated in the period from the first inflection point to the second inflection point, however the second current limiter circuit module herein operates, and the FET2 drain current I2 flows into the motor 5 so that the motor current Icw becomes;

$$Icw=I2+I1 \text{ (saturated)}$$

The current flow in the first current limiter circuit module and the second current limiter circuit module is saturated in the period from the second inflection point to the third inflection point. However, the third current limiter circuit module herein operates and the drain current I3 of the FET3 also flows into the motor 5 so that the motor current Icw becomes;

$$Icw=I3+I2 \text{ (saturated)}+I1 \text{ (saturated)}.$$

After passing the third inflection point, the current flowing into the first current limiter circuit module, the second current limiter circuit module, and the third current limiter circuit module is saturated so the motor current Icw becomes;

$$Icw=I3 \text{ (saturated)}+I2 \text{ (saturated)}+I1 \text{ (saturated)}$$

Shifting of the inflection point in the diagram (FIG. 8) for the current limiter circuit 10, 11 will now be described.

The shifting of the first inflection point is herein described. Since the other inflection points can be shifted in the same way, the description of shifting of the other inflection points is omitted.

As described hereintofore, changing the voltage divider ratio V1/Vm set by the VR1 changes the V1-Vm characteristics (FIG. 5). Specifically, the smaller the voltage divider ratio set by the VR1, the larger the motor 5 output voltage Vm when the divided voltage V1 saturates. On the other hand, the larger the voltage divider ratio set by the VR1, the smaller the motor 5 output voltage Vm when the divided voltage V1 saturates. In other words, as the voltage divider ratio set by the VR1 decreases, the inflection point shifts to the right side in the diagram, and as the voltage divider ratio increases, the inflection point shifts to the left side in the diagram.

Changing the voltage divider ratio V2/V1 set by the VR2, changes the V2-V1 characteristic (FIG. 6). Specifically, the smaller the voltage divider ratio set on the VR2, the smaller the V2 saturation voltage. On the other hand, the larger the voltage divider ratio set on the VR2, the larger the V2 saturation voltage. In other words, as the voltage divider ratio set on the VR2 decreases, the inflection point shifts downward in the diagram, and as the voltage divider ratio increases, the inflection point shifts upward in the diagram.

The electromagnetic damper control device according to the first embodiment of this invention is therefore capable of regulating the drain current I1 flowing in the FET1 by performing voltage-dividing of the voltage generated by the motor 5 so that the damping force of the electromagnetic damper can be controlled without supplying external power.

According to this device, the damping force of the electromagnetic damper can be easily regulated since the current-voltage characteristics of the current limiter circuit module can be changed by adjusting the resistor within the current limiter circuit module.

Since this electromagnetic damper control device comprises multiple current limiter circuit modules connected in parallel, the desired damping force can be obtained according to the electromagnetic damper operating speed, i.e., the number of rotations of the motor 5.

Figure 9:
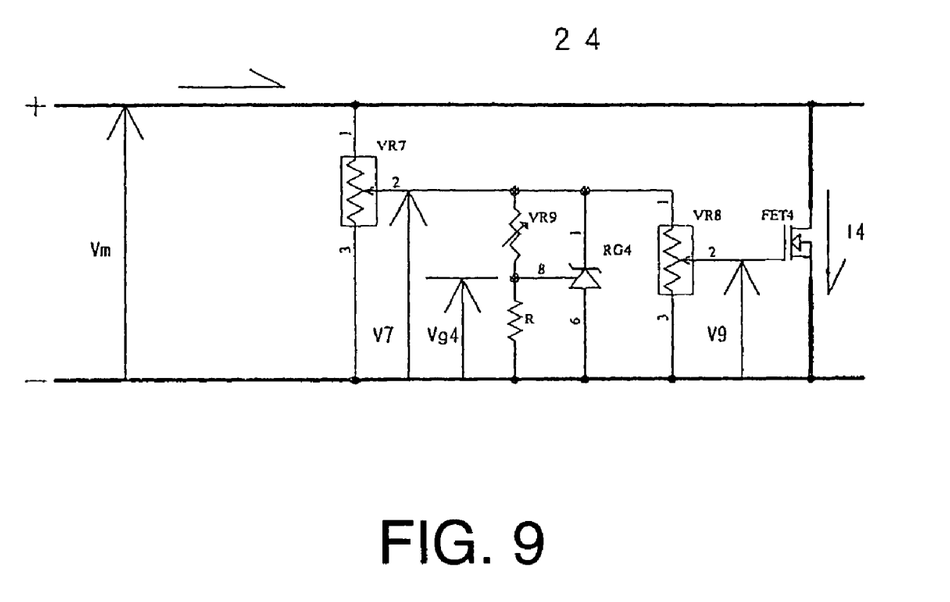
FIG. 9 is a circuit diagram of a current limiter circuit module according to a second embodiment of this invention.

FIG. 9 is a circuit diagram of a current limiter circuit module 24 within the current limiter circuits 10, 11 according to a second embodiment of this invention.

This second embodiment differs from the first embodiment (FIG. 3) described above in that the regulator voltage of the shunt regulator is changed by varying the reference voltage applied to the shunt regulator. The components other than the current limiter circuit module 24 within these current limiter circuits 10, 11 are the same as those described with respect to the first embodiment and hence the description of these components are herein omitted.

The induced electromotive force generated by the motor 5 rotating in the forward direction (CW) or the reverse direction (CCW) is applied as the voltage Vm to the current limiter circuit module 24 within the current limiter circuit. A resistor VR7 for voltage-dividing of the voltage Vm is connected across the positive and negative terminals of the current limiter circuit module 24. According to this second embodiment, the resistor VR7 is comprised of a variable resistor capable of changing the voltage divider ratio. The divided voltage V7 can be varied by the resistor VR7. A shunt regulator RG4 is connected across the negative terminal and variable contact point of the resistor VR7, and the voltage across the anode and cathode of the shunt regulator is regulated so as not to rise above a specified regulator voltage Vo determined by a reference voltage.

A resistor R is connected across the negative terminal of the current limiter circuit module 24 and the reference voltage terminal of the shunt regulator RG4. A variable resistor VR9 is connected across the variable contact point of the resistor VR7 and the reference voltage terminal of the shunt regulator 24. This resistor R and the variable resistor VR9 generate a reference voltage Vg4 for applying to the shunt regulator by further dividing the divided voltage V7 which is divided from Vm. In other words, varying the variable resistor VR9 changes the voltage divider ratio of the divided voltage V7, and changes the reference voltage Vg4 applied to the shunt regulator.

A variable resistor VR8 is connected in parallel with the shunt regulator RG4, and generates a gate voltage V9 for a field effect transistor FET4 by voltage-dividing (subdividing) the anode-cathode voltage of the shunt regulator. This field effect transistor. FET4 is connected across the positive-negative terminals of the current limiter circuit module 24, and regulates the current flowing in the current limiter circuit module 24 by controlling the drain current I4 by means of the gate voltage V9.

Next, the operation of the current limiter circuit module 24 according to the second embodiment will be described.

When the motor 5 rotates, an induced electromotive force is induced by the electrical generating effect, and the output voltage Vm is applied to the current limiter circuits 10,11 (current limiter circuit module 24). The voltage Vm applied to this current limiter circuit module 24 increases in proportion to the number of rotations of the motor 5. The number of rotations of the motor 5 increases as the cylinder 1 moves faster within the outer tube 2, and when. the Vm becomes high, the divided voltage V7 by the resistor VR7 rises in proportion to the voltage Vm according to the voltage divider ratio set on the resistor VR7. The gate voltage V9 of the FET4 also increases along with this, in proportion to the divided voltage V7 by the resistor VR7, according to the voltage divider ratio set on the resistor VR8.

When the number of rotations of the motor 5 further increases and the divided voltage V7 by the resistor VR7 reaches the regulator voltage Vo, the divided voltage V7 by the resistor VR7 comes into a saturation state where the divided voltage V7 is limited to the regulator voltage Vo, and thereafter the divided voltage V7 is maintained at the Vo, even if the voltage Vm applied to the current limiter circuit module 24 rises even further. In the same way, the gate voltage V9 divided by the resistor VR8, comes into a saturated state where the gate voltage V9 is limited to an upper threshold value determined by the regulator voltage Vo and the voltage divider ratio set on the resistor VR8.

The regulator voltage Vo of the shunt regulator RG4 is determined by the voltage VG4 applied to the reference voltage terminal of the shunt regulator RG4 and the resistor ratio VR9/R of the resistors connected to the reference voltage terminal. A shunt regulator, for example, TL431 by Texas Instruments Incorporated, is provided for generating a regulator voltage given for example by Vo=(1+VR9/R) Vg4, and by changing the resistance value of the variable resistor VR9, the regulator voltage Vo of the shunt regulator RG4 can be changed.

The gate voltage of the FET4 is V9 and therefore a drain current I4 flows according to the gate voltage V9 in a state where the gate voltage V9 is not saturated. In other words, when the gate voltage V9 increases, the drain current I4 of FET4 increases, and the current Icw in the motor 5 is made to increase.

Therefore, according to the second embodiment, by changing the reference voltage of the shunt regulator RG4 in this way, the regulator voltage Vo can be changed to widen the adjustment range of the gate voltage of the FET4. The range for adjusting the drain current can therefore be widened and, as a result, the adjustment range of the Icw (or Iccw) voltage inflection points can be widened as shown in FIG. 8. Thus, the damping force setting range of the electromagnetic damper is widened.

Figure 10:
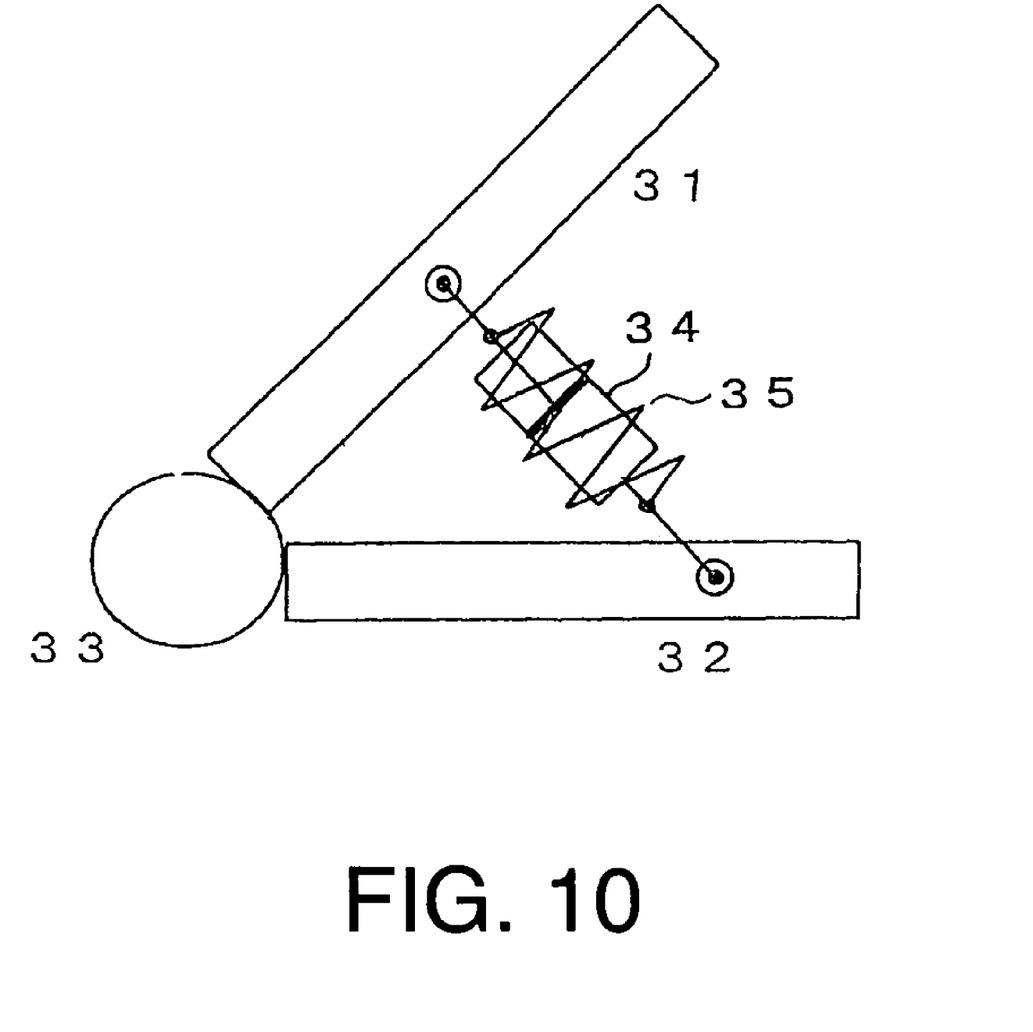
FIG. 10 is a schematic diagram of another electromagnetic damper to which the electromagnetic damper control device according to this invention is applied.

FIG. 10 is a structural view of another electromagnetic damper to which the electromagnetic damper control device according to this invention can be applied.

Unlike the previously described electromagnetic damper of FIG. 1 where the cylinder movement is linear, the electromagnetic damper of FIG. 10 is applicable to sections with a swing movement like that of a hinge.

In the electromagnetic damper shown in FIG. 10, a stationary section 31 and a moving section 32 are connected to allow movement relative to a motor 33. The motor 33 contains internal magnets and solenoids. This solenoids installed on the rotating shaft move in the vicinity of the magnets so that an induced electromotive force proportional to the rotation speed of the motor is generated in the, solenoids. In other words, the motor unit case, i.e., the stator, is installed on the stationary section 31, and the rotating shaft, i.e., the rotor of the motor, is attached to the moving section 32. When the moving section 32 moves relative to the stationary section 31, an induced electromotive force is generated in the motor 33. The electromagnetic damper control device of this invention regulates the electrical current flowing in the motor 33 to control the torque in the direction opposite to the rotation direction of the motor 33 to allow regulating the damping force on the moving section 32.

The motor 33 in this electromagnetic damper must generate a large torque so an auxiliary damper 34 may be installed between. the stationary section 31 and the body or moving section 32. Also, a spring 35 may be installed in parallel with the damper in order to maintain the stationary section 31, and moving section 32 in their specified positions. A reduction gear or transmission may be installed in the motor to amplify the torque generated by the motor and apply it to the moving section and stationary section.

In the embodiment shown in FIG. 10, there is no need to install a converter mechanism to convert the linear movement to a rotary movement so an electromagnetic damper with a simple structure can be obtained.

This invention is not limited to the embodiments described above. The scope of this invention is specified by the claims and not by the above description of the invention, and is intended to include all variations within the scope of the claims and equivalents,

INDUSTRIAL APPLICABILITY

This invention is capable of regulating the damping force of an electromagnetic damper without external power and is therefore suitable as an electromagnetic damper control device for vehicles, buildings, etc. This invention is particularly effective when utilized in locations where supplying electrical power is difficult.

The invention claimed is:

1. An electromagnetic damper control device for an electromagnetic damper, the damper comprising a first member containing a magnet, and a second member containing a solenoid, wherein a relative rotation of the first member and the second member generates an electromagnetic force in the solenoid which acts as a damping force to the relative rotation, the device comprising:

a current limiter element which operates based on the electrical voltage generated in the solenoid due to the relative rotation of the first member and the second member, the current limiter element limiting a current flowing through the solenoid to a predetermined current determined depending on a voltage generated in the solenoid; and a plurality of current limiter circuits comprising the current limiter element, the current limiter circuits connected in parallel and configured to operate at different voltages to limit the current flowing through the solenoid to the predetermined current.

2. The electromagnetic damper control device as defined in claim 1, wherein the device comprises a plurality of current limiter circuits each of which comprises the current limiter element, and the limiter circuits are connected in parallel and configured to operate at different voltages to limit the current flowing through the solenoid to the predetermined current.

3. The electromagnetic damper control device as defined in claim 1, further comprising a current limiter circuit comprising a fixed voltage element generating a fixed voltage and the current limiter element which limits the electrical current flowing through the solenoid to the predetermined current, wherein the fixed voltage generated by the fixed voltage element is applied to the current limiter element so as to limit the current flowing through the solenoid to the predetermined current, when the electrical voltage generated in the solenoid has reached a predetermined voltage.

4. The electromagnetic damper control device as defined in claim 3, wherein the current limiter circuit further comprises a setting circuit which sets the fixed voltage generated by the fixed voltage element.

5. The electromagnetic damper control device as defined in claim 3, wherein the fixed voltage element comprises a shunt regulator and the current limiter element comprises a field effect transistor, wherein the shunt regulator is configured to generate the fixed voltage when the electrical voltage generated in the solenoid has reached the predetermined voltage, and the field effect transistor is configured to control electrical current flowing between a source and a drain at a fixed current when the fixed voltage is applied to a gate of the field effect transistor.

6. The electromagnetic damper control device as defined in claim 5, wherein the shunt regulator comprises at least a first terminal connected to a high potential side and a second terminal connected to a low potential side and a reference voltage terminal to which a reference voltage for the operation of the shunt regulator, and the current limiter circuit further comprises a variable resister element which is interposed between the reference voltage terminal and the first terminal or between the reference voltage terminal and the second terminal and a setting circuit which sets the fixed voltage generated by the fixed voltage element.

7. The electromagnetic damper applied for claim 1, comprising a motor comprising a stator as the first member and a rotor as the second member, a cylinder performing a linear movement, and a motion converting member comprising a rotating member screwed on the cylinder to convert the linear movement into a rotational movement, the rotating member fixed to any one of the rotor and the stator, and configured to generate a damping force using an electromagnetic force that acts between the rotor and the stator.

8. The electromagnetic damper applied for claim 1, comprising a motor comprising a stator as the first member and a rotor as the second member, an arm member connected to one of the rotor and the stator, a fixed member connected to the other one of the rotor and the stator, and an auxiliary damper interposed between the arm member and the fixed member, and configured to cause any one of the rotor and the stator to rotate according to a swing motion of the arm member and generate a damping force using an electromagnetic force that acts on the motor.

* * * * *